Figure 1:
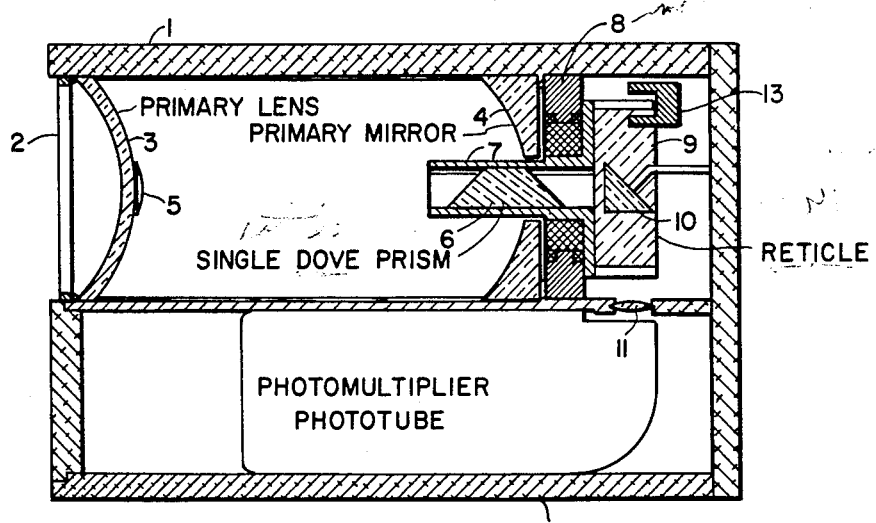

Oct. 30, 1962  G. JANKOWITZ  3,061,730
HIGH RESOLUTION TRACKER
Filed Oct. 19, 1960

INVENTOR.
GERALD JANKOWITZ
BY
Robert Ames Norton
ATTORNEY

United States Patent Office 3,061,730
Patented Oct. 30, 1962

3,061,730
HIGH RESOLUTION TRACKER
Gerald Jankowitz, Lewisboro, N.Y., assignor to Barnes Engineering Company, Stamford, Conn., a corporation of Delaware
Filed Oct. 19, 1960, Ser. No. 63,554
7 Claims. (Cl. 250—203)

This invention relates to an improved tracker radiation direction sensor using a single reticle and detector for both azimuth and altitude error signals.

A number of types of trackers have been developed but all have certain drawbacks. To understand the nature of these drawbacks requires a brief analysis of radiation tracking devices pointing out the problems which they present and how they have been partially solved. One kind of tracker images the field of view axially on a rotating reticle with alternating opaque and transparent bars. This type of reticle and imaging has been aptly referred to as a sunrise. If the target is imaged exactly on the center of the reticle radiation from it is not chopped but if it is displaced in either altitude or azimuth its radiation will be chopped and in different phase compared to two phase generators at right angles to each other or more correctly with phase angles 90° apart. The tracking device is extremely simple and light but where targets are very nearly centered no output information results which complicates servo mechanisms and greatly reduces accuracy. Spurious large targets, such as clouds, can also produce signals resulting in false information. This type of tracker in spite of its serious drawbacks is useful with short range missiles and very bright targets, and it has achieved spectacular military success in this very limited field. It is not useful for tracking at greater distances with faint targets.

The opposite extreme is represented by a tracker which has been used effectively in the tracking of rockets by infrared radiation. Here the reticle has different bands of bars and clear spaces and four aperture windows. One pair of aperture windows, at right angles to each other, cover a fairly large field and expose an angular portion of the reticle where there are bars of two widths, usually even multiples. The circle where the wide band and narrow band meet is the target center. Then at another part of the reticle where there are bars of constant width there are two very small aperture windows also at right angles to each other. The location of the apertures at a considerable distance from the center of the rotating reticle reduces to some extent the problem of the difference in chopping with difference in distance from the center of rotation. They do not, and particularly the larger acquisition apertures do not, eliminate background chopping. However, by the use of aperture edges across which the reticle pattern moves having segments with respect to the pattern covering an integral number of pattern cycles background chopping has been enormously reduced. The tracker operates with high precision and with excellent background elimination. This tracker is described and claimed in the copending application of Robert W. Astheimer and Monty M. Merlen, Serial No. 848,296 filed October 23, 1959, now Patent No. 2,961,545 November 22, 1960. The background rejection by aperture edge treatment is the subject matter of the copending application of Monty M. Merlen, Serial No. 78,772 filed December 27, 1960, which is, in part, a continuation of Serial No. 862,397 filed December 28, 1959, now abandoned. In spite of the almost ideal accuracy of the tracker just described it also has drawbacks. The optics and other elements are quadrupled because large apertures have to be used for acquisition of the object and the response in terms of error signal is not proportional, therefore the small apertures which come into play when the target is nearly centered are required in order to give a proportional response which prevents servo mechanism instability.

A simplified instrument retaining a considerable part of the accuracy of the Astheimer and Merlen tracker uses a small number of optical channels and detectors, namely one of each, with a reticle in which bars of different widths are arranged in a star shaped pattern on the reticle so that target displacement from the desired center line is interpreted as frequency difference for one error and phase difference for the other. This tracker is described and claimed in the copending application of Monty M. Merlen, Serial No. 16,290 filed March 21, 1960, now Patent No. 3,007,053. The simplified tracker presents enormous difficulties in reticle construction. Reticles, even of the type of the Astheimer and Merlen tracker, are hard enough to construct with the desired accuracy of bars and the Merlen tracker presents an even more serious problem. However, for many purposes its accuracy is entirely adequate and it represents a very light and simple tracker.

The present invention covers a tracker which is as light as the Merlen tracker with the accuracy and resolution at least as great and in fact somewhat greater than the Astheimer and Merlen tracker. It accomplishes this result in a very simple and rugged construction by utilizing a new and different concept of scanning and tracking. It retains the best features of the known trackers while eliminating the drawbacks.

Essentially the present invention includes a single collecting optical system, a single detector and a drum reticle with horizontal lines which can be achieved with a spacing precision and straightness of edge far greater than the best can be done with disc reticles. The present invention produces a signal in which both the azimuth and altitude errors are expressed by frequency modulation of the basic chopping frequency and the type of error is determined by phase. The electronic amplifying and processing circuits are simple and reliable but while they involve completely conventional and straight forward electronic circuit design they must, of course, be properly arranged to process the error signals which are produced by the present invention. Although, therefore, the individual design of any component or part of the electronic processing circuits forms no part of the present invention the organization of circuits does.

Figure 2:
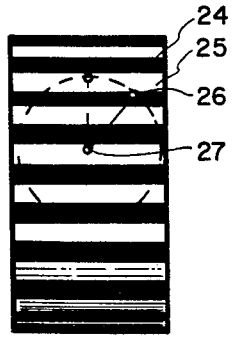
Figure 4:
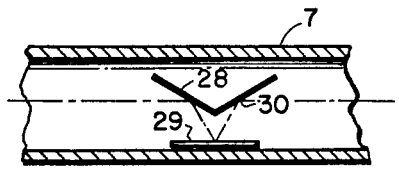
Figure 3:
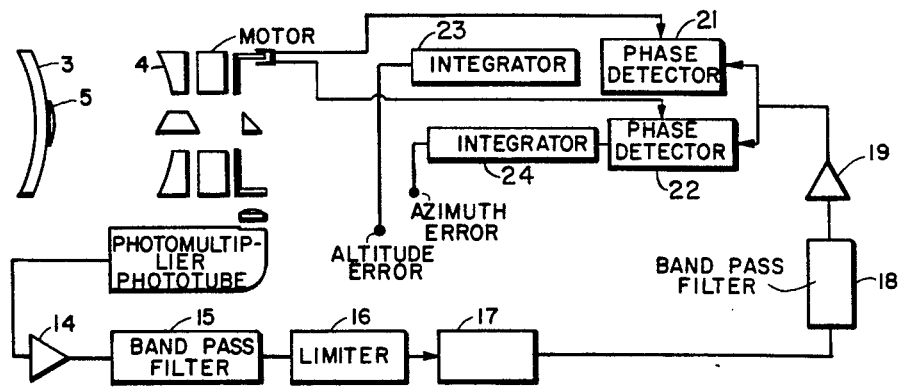

The present invention will be described in more detail in conjunction with a star tracker where maximum precision, high background elimination and high sensitivity is of great importance. As such trackers may be included in satellites the extreme light weight of the trackers of the present invention is a further important advantage. It should be understood that the radiation which is used in the tracker need not be visible light. On the contrary, all of the advantages of the trackers are obtained if infrared light is used or even, though this case would be exceedingly rare, ultraviolet light. Accordingly it should be considered that the invention may use any kind of optical radiation, that is to say radiations of wavelengths sufficiently short to obey geometrical optical laws accurately. There is no change when other radiations are utilized except, of course, the obvious one that radiation detectors and optical elements must be of a nature to operate satisfactorily at the wavelengths of the radiation chosen. The invention will also be described in greater detail in conjunction with the drawings in which:

FIG. 1 is a diagrammatic section of the optical head;
FIG. 2 is a detailed view of a portion of the reticle with the drum surface shown straightened out;
FIG. 3 is a diagram showing the optical head with the electronic amplifying and processing circuits shown in block form, and FIG. 4 is a section through a modified target image rotator.

The optical head in FIG. 1 is illustrated as mounted in a head casing 1 with window 2, primary lens 3, primary mirror 4 and secondary mirror 5. This portion of the optics is essentially a catadioptric system in which the mirror portion is of the Cassegrain type. The rays from the secondary mirror 5 pass in a small bundle through a Dove prism 6 which is mounted in a rotating sleeve 7 turned by an induction motor 8. The same sleeve also drives a drum reticle 9 provided with parallel opaque and transparent bars which are shown in detail in FIG. 2. The rays strike a reflecting prism 10 and are reflected down through the drum reticle the optics imaging onto the plane of the reticle surface. The field lens 11 then passes the image onto the cathode of a photomultiplier tube 12 shown purely diagrammatically in FIG. 1.

The effect of the rotating Dove prism is to rotate the image formed by the optics at a uniform rate, as shown in FIG. 2 in synchronism with the drum reticle. If a target is off center its image will describe a circle on the reticle. The rotating reticle also actuates a reference generator 13 diagrammatically illustrated as a magnetic pulse generator. The reticle carries magnetic inserts. These inserts are spaced so that the phase reference generator 13 will generate pulses at two different phases 90° apart with respect to the rotation of the image by the Dove prism.

Turning to FIG. 2 a portion of the reticle is shown and for convenience it is shown as if the curved surface of the reticle were straightened out. Alternating opaque bars 24 and clear spaces 25 of equal width chop the incoming radiation at predetermined frequency depending on the rate of rotation of the reticle and the number of bars. This frequency will appear in a later description as a center frequency and is much higher than the frequency of rotation of the Dove prism.

A situation illustrating a target which is off center both in altitude and azimuth is illustrated by the image of the target 26 shown rotating in dashed lines on FIG. 2. It will be noted that the distance from the optical center, represented in FIG. 2 as 27 determines the degree by which the target is off center. As the image of the target is rotating it does not immediately appear whether it is off center in altitude or azimuth or both as the length of the line from 26 to 27 merely represents the length of the vector produced by the displacement from center. As the target image 26 rotates it will be noted that it moves with respect to the bars of the reticle in such a manner that there are two components, one at right angles to the reticle bars and the other across them. The relative magnitudes of these two components depend, of course, on the position of the target at any particular instant.

First the effect of the component at right angles to the reticle bars will be considered. This will alternately result in an increase or decrease in chopping frequency depending at any one instant whether the component is opposite to the movement of the reticle bars or in the same direction. There will thus be produced a frequency modulation of the basic chopping frequency effected by the reticle. That is why, as was pointed out above, the chopping frequency must be much higher than the frequency changes resulting from the moving target. A moment's consideration of FIG. 2 will show that the magnitude of the modulation, that is to say, the band of frequency changes will depend on the length of the vector from 27 to 26. When the target is centered this vector is 0 and so is the frequency modulation. In accordance with good FM practice the maximum frequency deviation should not exceed one half the center frequency which in this case is the chopping frequency of the reticle bars.

The second component of the moving target image vector should now be considered. Let us assume that the target has both altitude and azimuth error. This will be represented by a phase difference from the positions where the target image would have been to be in exact phase with the reference signal generator 13 pulses for altitude and azimuth respectively. These two positions are shown in dashed lines in FIG. 2 for simplicity assuming that the upper position corresponds to zero altitude error and the horizontal one to zero azimuth error. With respect to these two pulses the frequency modulation will show a phase difference and the phase difference will be proportional to the relative amount of each error represented by the target position. The interpretation of these phase differences will be described below in conjunction with the description of the electronic circuits.

FIG. 3 shows a simplified diagram of the optics and also the electronic circuits. The output of the photomultipler is amplified by the amplifier 14 and passes through a bandpass filter 15. The signal from the photomultiplier tube is frequency modulated if there is any error in the target position. Of course, the center frequency is much lower than that ordinarily used in FM radio communication. The bandpass filter 15 produces substantially the same type of result as does the sharply tuned stages of intermediate frequency amplification in the usual FM receiver. A limiter 16 is then provided to remove any amplitude variations from the signal so that all targets having a radiation above the threshold minimum will give a signal of the same amplitude. At 17 there is a discriminator circuit which transforms the FM modulation into an AM modulated signal the amplitude of which is proportional to the frequency deviation. This is precisely the same type of operation that occurs in an ordinary FM radio receiver in which case the modulation is at audio frequency. Here it is, of course, at image rotational frequency which is double the rotation frequency of the Dove prism. After further amplification in amplifier 19 the signal is introduced into two parallel phase detectors 20 and 21. These phase detectors receive in opposite phase the signal from the phase reference generator. They produce signals proportional to phase difference in each case which, after being integrated in integrators 22 and 23, constitutes the altitude and azimuth error signals. These are processed in a normal manner in servo mechanisms which aim the optics. The servo mechanisms form no part of the present invention and are, therefore, not shown.

It will be seen, therefore, that the position of the target determines two things, first the magnitude of its departure from centering which is the length of the vector 26 to 27 and secondly the phase with respect to the position it should have occupied had there been no altitude or no azimuth error respectively. The error signals are, therefore, proportional both to the absolute departure from centering and to the relative components in this departure in altitude and azimuth. Both error signals are proportional signals being rapidly reduced in intensity as the target nears centering. This permits very precise tracking and a stable servo system.

FIG. 4 illustrates a different optical element for producing image rotation namely three mirrors 28, 29 and 30 which can be mounted in the sleeve 7 in the place of the Dove prism. The two optical elements perform the same result but have somewhat different advantages and drawbacks. The Dove prism is very rugged and once accurately made presents no problem of maladjustment. It is, however, not achromatic and if a wide band of radiation is used in which the prism material has serious amounts of dispersion the position of the target image will not be the same for different radiation wavelengths. The mirrors are, of course, achromatic but they are harder to keep in perfect adjustment. The choice of one or other optical element is determined entirely by operational requirements. They are both simply means for rotating a target image. It should be noted that for long ranges of wavelength in the infrared, for example, for wavelengths substantially longer than 2μ a germanium prism is almost achromatic and so in this region presents considerable advantages over the mirrors without substantial drawbacks.

The advantages of the frequency modulation of the basic reticle chopped frequency are retained if instead of a drum reticle an off center disc reticle is used as in the case of the Astheimer and Merlen trackers. In such a case, of course, the mirror 10 becomes unnecessary as the radiation detectors are in line with the rest of the optics. This modification, although included, presents practically no advantages and does not have a great advantage of the complete parallelism of the bars on the drum reticle. The latter is therefore preferable in most precision instruments.

I claim:

1. A tracker comprising in combination and in optical alignment collecting optics, a moving reticle provided with a uniform radiation interrupting pattern, and a radiation detector means for imaging the beam of the field of view of the optics onto the plane of the reticle, means for rotating the image about an axis at right angles to the movement of the reticle pattern and to the reticle plane at a frequency lower than that of the radiation interruption, whereby a frequency modulated signal is produced from the radiation detector, means for amplifying and demodulating the signal to produce an amplitude modulated output proportional to frequency modulation, phase reference signal generating means at 90° out of phase with the rotation of the image, means for actuating the reference signal generating means in synchronism with beam rotation, phase detecting means having inputs connected to the demodulated signal and the phase reference signals in opposite phase whereby said detecting means produce outputs in proportion to the relative phases of the demodulated FM signal.

2. A tracker according to claim 1 comprising a drum reticle with a hollow axis rotating about the optic axis of the image rotating means and means for reflecting the image onto the plane of the drum reticle.

3. A tracker according to claim 2 in which the image rotating means is a Dove prism.

4. A tracker according to claim 2 in which the image rotating system consists of three mirrors.

5. A tracker according to claim 3 in which the Dove prism is mounted in a hollow axis of the rotating drum reticle.

6. A tracker according to claim 4 in which the mirrors are mounted in a hollow axis of the rotating drum reticle.

7. A tracker according to claim 2 in which the reference signal generators are actuated by the rotating drum reticle.

References Cited in the file of this patent

UNITED STATES PATENTS

| | | |
|---|---|---|
| 1,890,558 | Baird | Dec. 13, 1932 |
| 2,385,086 | D'Agostino et al. | Sept. 18, 1945 |
| 2,931,912 | MacLeish | Apr. 5, 1960 |
| 2,961,545 | Astheimer et al. | Nov. 22, 1960 |
| 2,965,762 | Turck | Dec. 20, 1960 |
| 2,967,246 | Ostergren | Jan. 3, 1961 |
| 2,968,735 | Kaufold et al. | Jan. 17, 1961 |